United States Patent

Comellas

[15] 3,649,085

[45] Mar. 14, 1972

[54] GROUND-ENGAGING TRACK FOR TRACKED VEHICLES

[72] Inventor: Edouard Martin Comellas, 40 de la Fonderie Street, Cap de la Madeleine, Quebec, Canada

[22] Filed: Feb. 19, 1970

[21] Appl. No.: 12,815

[52] U.S. Cl. ................................................ 305/38, 305/56
[51] Int. Cl. ................................................................ B62d 55/20
[58] Field of Search ...................... 305/35, 36, 37, 38, 56, 57, 305/58

[56] References Cited

UNITED STATES PATENTS

| | | | |
|---|---|---|---|
| 2,264,135 | 11/1941 | Kaminsky | 305/35 |
| 2,335,228 | 11/1943 | Allen | 305/36 |
| 2,061,229 | 11/1936 | Fergusson | 305/36 |
| 3,285,676 | 11/1966 | Hetteen | 305/38 X |
| 3,539,230 | 11/1970 | Comellas | 305/38 |

FOREIGN PATENTS OR APPLICATIONS 658,255   2/1963   Canada......................................305/36

*Primary Examiner*—Richard J. Johnson
*Attorney*—Pierre Lesperance

[57] ABSTRACT

An all-purpose endless track for tracked vehicles, for travelling over hard as well as soft surfaces without damaging either. The ground-engaging surface of the track is substantially flat and smooth with no pavement damaging projecting cleats or the like bosses. This ground-engaging surface is provided with recesses arranged in longitudinal rows, the recesses of any given row being staggered relative to the recesses of an adjacent row, whereby the ground material will enter these recesses under the vehicle weight and load, resulting in considerably diminished damage to soft soil and while achieving improved draw bar pull of the vehicle. The staggered arrangement of the recesses prevents lateral slipping of the track and the increased thickness of the track sides increase the flotation of the track.

6 Claims, 6 Drawing Figures

Patented March 14, 1972
3,649,085
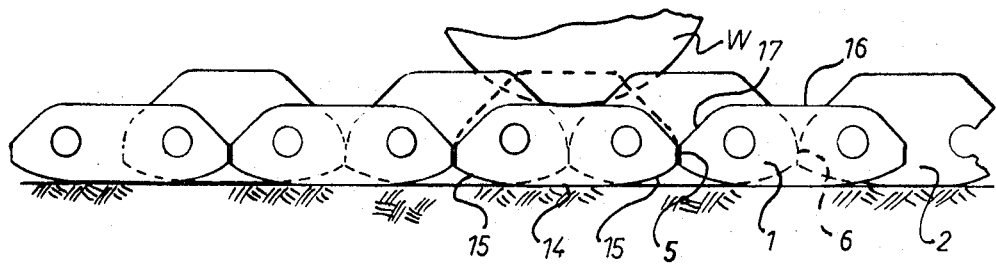
Fig.1
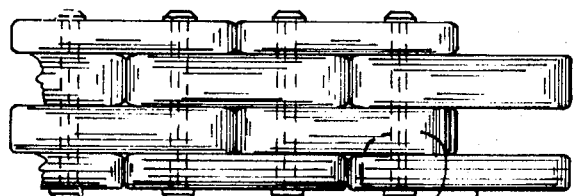
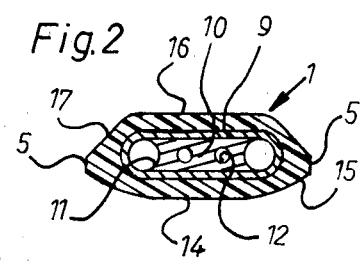
Fig.2
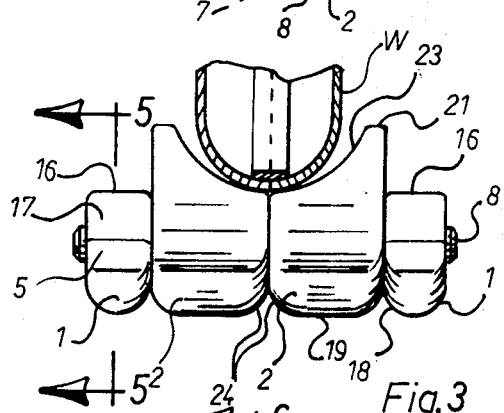
Fig.3
Fig.5
Fig.6
Fig.4
INVENTOR
Edouard Martin COMELLAS
BY Pierre Lespérance
AGENT
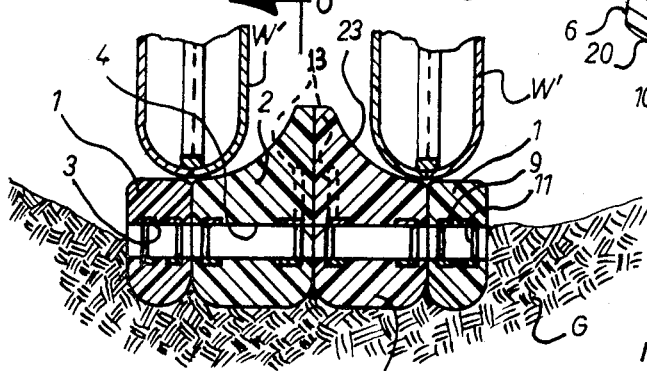

GROUND-ENGAGING TRACK FOR TRACKED VEHICLES

The present invention relates to a track system for a tracked vehicle and, more particularly, to the configuration of the ground-contacting outer and lateral surfaces of the track.

One known type of endless track consists of a pair of spaced endless belts with ground-engaging cross bars forming sharp projections designed to provide increased traction. These projections do damage to hard surfaces, such as pavement, and still greater damage to soft ground, such as marshlands, moss-covered or permafrost areas.

It is known that, once permafrost ground is scarified by off-road vehicles, the top layer of the permafrost begins to melt and breakdown of the land is initiated.

Moreover, known endless tracks have relatively poor traction on marshland and other soft ground, because the vehicle quickly bogs down due to poor flotation characteristics of the track.

It is the general object of the invention to provide a track which overcomes the above-mentioned disadvantages.

The main object of the invention is to provide a track which has considerably improved traction as measured by the draw bar pull of the vehicle equipped with such tracks, which considerably diminishes damage to soft as well as hard ground surfaces and which has increased flotation characteristics.

Another object of the invention is to provide a track of the character described, having increased thickness and no sharp edges to prevent shearing of the ground and to increase its floatability in soft ground, thereby decreasing the damage to the ground.

Another object of the invention resides in the provision of a track of the character described, composed of a plurality of stocks or track units, which are relatively rigid and which are arranged in longitudinal rows and pivotally interconnected by transverse pins or other pivotal connection, the blocks of any one row being displaced half the length of a block with respect to the blocks of adjacent rows, the track forming a relatively imperforate track when laid in flat condition, the track recesses being formed by two adjacent blocks of a row, whereby self-cleaning of the track is obtained by relative pivoting of said two adjacent blocks.

The track of the invention is mainly characterized by the fact that it makes a reverse imprint on the ground or other surface on which it travels, the ground being compressed by the vehicle weight and load and made to raise within recesses or cavities at the track ground-engaging surface.

Because no shearing of the ground is made, the ground cohesion remains intact and the ground bosses formed within the track recesses and compressed therein become more coherent and provide for very much increased traction of the track. On wet ground, such as marshland, water is expelled from the bosses; on snow, regelation occurs and the frozen bosses provide traction improving means. Due to the staggered arrangement of the recesses transversely of the track, lateral slipping is prevented.

The foregoing and other objects of the invention will become more apparent during the following disclosure and by referring to the drawings, in which:

FIG. 1 is a side elevation of a portion of the track of the invention;

FIG. 2 is a plan view of the ground-engaging surface of a portion of the track of the invention;

FIG. 3 is an end view of the track portion of FIG. 2 and also showing a track-engaging wheel in cross section;

FIG. 4 is a cross-section of another track arrangement using the same blocks or track units and taken at the level of a pin connection, the latter not shown; and FIGS. 5 and 6 are longitudinal sections along lines 5—5 and 6—6 respectively of FIGS. 3 and 4.

In the drawings, like reference characters indicate like elements throughout.

The track of the invention is preferably composed of two types of track units or blocks 1 and 2 with the blocks of the same type arranged in longitudinal rows, all the blocks being of equal length, provided with transverse bores 3 and 4 respectively opening at the lateral faces of the blocks, said bores being equally distant from the end faces 5 and 6 respectively of blocks 1 and 2, the distance between the axes of the two bores of each block being equal to half the length of the block.

Pivot pins 7 are inserted within the registering bores 3, 4 of the blocks 1 and 2 and serve to provide a pivotal connection between the blocks, the pins 7 being fitted at their ends with caps 8 on the outside of the outer rows of the blocks for retaining the blocks together.

The pivotal connection schematically represented by pins 7 is preferably of the type described in my copending patent application entitled: "ANTI-FRICTION PIVOTAL CONNECTION FOR ELEMENTS UNDER TENSION"—Ser. No. 769,224, filed Oct. 21, 1968, now U.S. Pat. No. 3,531,165 issued Sept. 20, 1970.

The blocks 1 and 2 are made of elastomeric material, preferably suitably vulcanized rubber, to the consistency of the rubber in conventional tires. Embedded in the mass of rubber is, in each block, a loop 9 made of metal with a metal web 10 between the two strands of the loop and forming therewith circular holes 11 in register with the bores 3 and 4. Preferably, web 10 further has smaller diameter holes 12 through which the rubber extends, serving to anchor the loops 9 within the block 1 or 2.

The blocks 2, being of greater thickness, have an additional reinforcing plate 13 upstanding from the loop 9 in the area of maximum thickness of the block 2 and secured to said loop.

Each block 1 has a ground-engaging outer face defined by a central substantially flat face portion 14 and inclined or bevelled terminal face portions 15. The latter are substantially convex when seen in profile, but are generally straight in cross section.

The terminal face portions 15 merge with the central face portion 14 and join with the end face 5, the latter being flat and substantially at right angles to central face portion 14.

The length of each central face portion 14 is substantially equal to half the overall length of the block 1.

Each block 1 has an inner substantially straight and flat central face portion 16 smoothly merging with inner bevelled terminal face portions 17 inclined at substantially 45° to parallel face portions 16 and 14. The blocks 1, when seen in end elevation or in cross section, provide rounded corners 18 at their outer longitudinal edges, as seen in FIGS. 3 and 4. The larger size blocks 2 have a central outer face 19, which is substantially flat and smooth and which merges at its ends with two inclined terminal face portions 20, the latter being generally convex when seen in longitudinal section, but substantially straight in cross section.

Each block 2 has a thickness greater than block 1 and defines an inner longitudinally extending central face 21, which is substantially flat and which merges at its ends with he two inner terminal faces 22 inclined at about 45° with respect to parallel faces 21 and 19.

The inner central face 21 joins with a flat side face of the block 2 and is much smaller in width than the total width of said block 2. Along its other longitudinal edge, it joins with a transversely curved face portion 23, which is concave in shape and joins with face 21 at nearly right angle while its other lateral edge is tangent to a plane substantially parallel to the plane containing face 19 and, therefore, joins at substantially right angle with the other lateral flat face of the block 2.

The outer longitudinal edges of the block 2 form rounded corners 24, as shown in end view in FIG. 3, and in cross-section in FIG. 4.

As shown in FIG. 2, the ground-engaging face of the track, when the latter is laid on the ground and is substantially flat, is substantially imperforate with the end faces 5 of blocks 1 and the end faces 6 of blocks 2 in practically abutting relation.

The recess formed by the adjoining inclined terminal faces 15 of adjacent blocks 1 and the similar recesses formed by the adjoining inclined terminal faces 20 of adjacent blocks 2 in a row are all substantially equally spaced along the row and are staggered transversely of the track. More particularly, the length of each central outer face 14 or 19 is substantially equal to the length of an intervening recess and the recesses of any given row are displaced relative to the recesses of an adjacent row a distance equal to about half the distance between the centers of two adjacent recesses in the same row. The recesses are deep enough to permit accumulation and compression of ground material therein to form ground bosses or a reverse imprint high enough to serve as traction improving means. The recesses have a substantially symmetrical V-shaped section longitudinally of the track. The recesses and flat surface portions 14 or 19 of the same row have substantially equal width. The thickness of units or blocks 1 from face 14 to face 16 is preferably equal to about one-third the length of said blocks. The same holds true for blocks 2 when considering their minimum thickness.

It will be noted that the flat outer faces 14 and 19 and that inner face 16 and the longitudinal extent of face 23 are parallel one to the other and parallel to the line joining the axes of bores 3 and 4.

End faces 5 or 6, which are perpendicular to outer faces 14 or 19, lie in a zone offset from the line joining the axes of bores 3 or 4 in the direction of faces 14 or 19. Thus, relative pivoting of two adjacent blocks 1 or 2 with their faces 14 or 19 moving towards each other, is progressively resisted by compressive compression of the block end portions which are in mutual abutment at end faces 5 or 6. Obviously, inclined faces 17 or 22 allow free pivotal movement of one block relative to the other of the same row, in a direction in which inner faces 16 or 21 move towards each other.

When the track travels on soft ground, the weight of the vehicle and of its load will cause the ground to penetrate into the recesses between the blocks 1 and 2, causing a reverse impring on the ground. The resulting ground projections are compressed within the recesses, resulting in good cohesion which is not impaired, because the projections are not sheared in any way; this reverse imprint provides for greater draw bar pull of the vehicle provided with the track of the invention, as compared to conventional tracks.

Actual tests have confirmed the above affirmation. Moreover, the increased traction is obtained due to the fact that the ground projections do not extend completely transversely of the track and are staggered with respect to one another, transversely of the track.

Because the inclined terminal face portions 15,20 of the blocks 1 and respectively are slightly convex and merge smoothly with the central outer faces 14 and 19 of said blocks respectively and because the blocks have outer longitudinally extending rounded corners 18 and 24 respectively, the track does not provide any sharp edges at its ground-engaging surface and the ground, even when very soft, is not sheared, whereby the track causes minimum damage to the soil. Furthermore, the rounded longitudinal corners 24, 18 provide for increased surface area of the track in engagement with soil, increasing the traction efficiency of the track.

The track has also increased floatability because it has increased thickness with respect to conventional tracks. This increased thickness is possible due to the fact that the blocks 1 and 2 are all interpivotally connected to one another and, therefore, there is practically no resistance to track flexing. As shown in FIG. 4, when the track is travelling on soft ground G, the lateral faces of the track which are of substantial height cause the track to displace a substantial volume of soft ground G which acts in a manner similar to a liquid, whereby increased flotation is obtained. Moreover, because the ground G is in pressurized contact with the sides of the track, the greater surface of the track in contact with the ground increases the traction efficiency.

The blocks 1 and 2 constituting the track may be arranged in different manners in accordance with the requirements; for instance, as shown in FIG. 3, for a vehicle having a single row of vehicle supporting wheels W for each track, the blocks 2 are arranged so that their transversely curved inner surfaces 23 extend at both sides of the wheel, each guiding surface 23 engaging one side of the wheel W, while in a vehicle wheel system in which pairs of wheels W' are arranged on a common shaft, the blocks 2 are disposed with faces 21 adjacent each other at the center part of the track, so that transverse curved faces 23 will extend on the inner side of the respective wheels W'. Here again proper guiding of the track on the wheels is achieved. Several arrangements of the blocks 1 and 2 are possible, it being sufficient to increase or decrease the number of rows of blocks and to modify their arrangement to suit various types of vehicles while only using two standard types of blocks or modules.

Also, it is noted that the track can be very easily shortened or lengthened. Moreover, the blocks can be easily replaced when broken or damaged.

An important characteristic of the invention lies in the fact that the recesses formed by terminal inclined faces 15 of blocks 1 and/or 20 of blocks 2, are arranged at the junction of two adjacent blocks of a row, so that the track outer surface is substantially self-cleaning, because any material adhering to the track blocks within the recesses is broken up and falls away upon flexing of the track when turning around the end wheels and driving sprockets of the tracks.

The track of the invention is an all-purpose track because, due to its smooth ground-engaging surface, it can travel on soft as well as on hard terrain of any description while hardly damaging the same. Although it has been mentioned that the blocks are preferably made of elastomeric material, they can be made of any other material.

It has been found in actual tests that the track of the invention has a very limited shovelling effect in the sense that very little material is thrown at the back of the travelling vehicle, contrary to conventional track. This means that the track does not work on its own refuse, explaining the increase traction efficiency of the same.

Comparative tests were carried out with identical track laying vehicles with one equipped with the track of the invention and the other with a conventional track of the type comprising two endless rubber belts with cross metal links projecting from the outer ground-engaging surface of the track.

In a first series of tests, the draw bar pull was measured in relation to the percentage of slip of the vehicle on the ground. Tests were carried out on muskeg, asphalt, crushed rock, concrete, sandy, clay, silt, sand and gravel. All the performance curves have revealed that the track of the invention is superior to the conventional track above described, because the track of the invention consistently provides higher draw bar pull at low slip. The track of the invention pulled the same load faster than a conventional track or pulled a greater load at the same speed. Therefore, when the track of the invention is fitted on a load carrying vehicle, it is able to keep moving through conditions that would bring a conventional track to a halt. This has been verified by comparative tests in wet muskeg carried out by the two above-named vehicles. The vehicle fitted with the track of the invention was able to make 103 passes through wet muskeg before becoming bogged down, while the vehicle fitted with conventional tracks became bogged down after only 39 passes. In all types of terrains, it was found that the track of the invention definitely did considerably less damage to the ground than the conventional track.

I claim:

1. A track arrangement for a track vehicle comprising a plurality of pivotally interconnected track units arranged in longitudinal rows, each unit comprising an elongated body having two spaced transverse bores intermediate its ends defining a central portion between said bores and end portions outside said bores, the length of said end portions being equal to at the most half the length of said central portion, the units of a row being displaced longitudinally for the distance of one-half the length of a unit relative to the units in an adjacent row, means for pivotally connecting said rows in side-by-side relation and for pivotally connecting the units of any given row to the units of an adjacent row, said means including pivot members extending through said bores and retaining means for retaining said pivot member in said bores, the central portions of said units having a ground-engaging substantially flat central outer face substantially parallel with a line adjoining said bore axes and said end portions having a terminal ground-engaging face inwardly inclined with respect to said line from said central portion towards the ends of the unit, said flat outer faces of the various units lying in a substantially common flat plane and any two adjacent units of any given row abutting each other at their end when the units of any given row are in mutual alignment, the adjacent inclined terminal ground-engaging faces of any two adjacent units of any given row forming a recess opening only at the ground-engaging faces of said units.

2. A track as claimed in claim 1, wherein the length of each ground-engaging outer face is substantially equal to the length of an intervening recess.

3. A track arrangement as claimed in claim 1, wherein said inclined ground-engaging faces merge smoothly with said central outer face.

4. A track arrangement as claimed in claim 1, wherein the ends of said units are defined by end faces which are substantially perpendicular to said central outer face.

5. A track arrangement as claimed in claim 1, wherein the longitudinal marginal portions of said central outer face have a rounded cross section.

6. A track arrangement for a track vehicle comprising a plurality of pivotally interconnected track units arranged in longitudinal rows, each unit comprising an elongated body having two spaced transverse bores intermediate its ends defining a central portion between said bores and end portions outside said bores, the length of said end portions being equal to at the most half the length of said central portion, the units of a row being displaced longitudinally for the distance of one-half the length of a unit relative to the units in an adjacent row, means for pivotally connecting said rows in side-by-side relation and for pivotally connecting the units of any given row to the units of an adjacent row, said means including pivot members extending through said bores and retaining means for retaining said pivot member in said bores, the central portions of said units having a ground-engaging substantially flat central outer face substantially parallel with a line adjoining said bore axes and said end portions having a terminal ground-engaging face inwardly inclined with respect to said line from said central portion towards the ends of the unit, said flat outer faces of the various units lying in a substantially common flat plane and any two adjacent units of any given row abutting each other at their end when the units of any given row are in mutual alignment, the adjacent inclined terminal ground-engaging faces of any two adjacent units of any given row forming a recess opening only at the ground-engaging faces of said units, the ends of said units being defined by end faces which are substantially perpendicular to said central outer face, said end faces lying in a zone offset from said line joining said axes in the direction of said ground-engaging outer faces each body having an inner face, opposite its ground-engaging outer face, which has bevelled inner end face portions allowing free relative pivoting of said units when said inner faces move towards each other, relative pivoting of said units in the opposite direction being progressively resisted by progressive compression of said end portions in mutual abutment at said end faces.

* * * * *